US010683943B2

(12) United States Patent
Kozlowski et al.

(10) Patent No.: US 10,683,943 B2
(45) Date of Patent: Jun. 16, 2020

(54) SERVOVALVE

(71) Applicant: Hamilton Sundstrand Corporation, Charlotte, NC (US)

(72) Inventors: Piotr Kozlowski, Mielec (PL); Michał Bieleń, Syców (PL); Wojciech Plucinski, Wrzesnia (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/591,582

(22) Filed: May 10, 2017

(65) Prior Publication Data
US 2018/0051814 A1 Feb. 22, 2018

(30) Foreign Application Priority Data

Aug. 16, 2016 (EP) .................................... 16461550

(51) Int. Cl.
| | | |
|---|---|---|
| F16K 11/07 | (2006.01) | |
| F16K 31/04 | (2006.01) | |
| F15B 13/044 | (2006.01) | |
| F15B 13/043 | (2006.01) | |
| F15B 13/04 | (2006.01) | |
| F16K 31/52 | (2006.01) | |

(52) U.S. Cl.
CPC ...... F16K 11/0716 (2013.01); F15B 13/0402 (2013.01); F15B 13/0444 (2013.01); F16K 31/04 (2013.01); F16K 31/047 (2013.01); F16K 31/523 (2013.01); F15B 13/0407 (2013.01); F15B 13/0435 (2013.01)

(58) Field of Classification Search
CPC .............. F15B 13/0435; F15B 13/0438; F15B 13/0448

USPC .......................... 137/625.65, 625.67, 625.68
See application file for complete search history.

(56) References Cited

U.S. PATENT DOCUMENTS

| | | | | | |
|---|---|---|---|---|---|
| 2,910,081 | A | * | 10/1959 | Karbowniczek | .... F16K 11/0716 137/625.68 |
| 3,227,172 | A | * | 1/1966 | Sims | ....................... B21B 37/50 137/116.3 |
| 3,385,309 | A | * | 5/1968 | Bains | ...................... F15B 5/003 137/625.62 |
| 3,550,631 | A | * | 12/1970 | Vanderlaan | ............. F15B 13/04 137/625.65 |
| 3,561,489 | A | * | 2/1971 | Furrer | ................... B65G 65/00 137/625.63 |

(Continued)

FOREIGN PATENT DOCUMENTS

| | | |
|---|---|---|
| GB | 2104249 A | 3/1983 |
| JP | S527024 A | 1/1977 |

OTHER PUBLICATIONS

European Search Report for Applicaiton No. 16461550.2-1754, dated Feb. 8, 2017, 5 Pages.

*Primary Examiner* — Mary E McManmon
*Assistant Examiner* — Richard K. Durden
(74) *Attorney, Agent, or Firm* — Cantor Colburn LLP

(57) ABSTRACT

A servovalve comprising: a fluid transfer valve assembly comprising a supply port and a control port; a moveable valve spool arranged to regulate flow of fluid from the supply port to the control port in response to a control signal; and a drive member configured to axially move the valve spool relative to the fluid transfer assembly in response to the control signal to regulate the fluid flow.

5 Claims, 7 Drawing Sheets

(56) References Cited

U.S. PATENT DOCUMENTS

| | | | | |
|---|---|---|---|---|
| 3,643,699 | A | * | 2/1972 | Mason ................ F15B 13/0435 137/625.64 |
| 3,672,399 | A | * | 6/1972 | Furrer ................. F16K 11/0716 137/625.62 |
| 3,772,889 | A | * | 11/1973 | Mason ...................... F04B 1/18 417/295 |
| 3,785,216 | A | * | 1/1974 | McLean .................... G01L 3/20 73/862.16 |
| 4,046,061 | A | | 9/1977 | Stokes |
| 4,193,425 | A | * | 3/1980 | de la Bouillerie .. F15B 13/0402 137/625.61 |
| 4,553,731 | A | * | 11/1985 | Carpenter ............... F16K 1/221 110/163 |
| 4,779,648 | A | * | 10/1988 | Sloate ................ F15B 13/0402 137/625.6 |
| 4,793,377 | A | | 12/1988 | Haynes et al. |
| 4,987,927 | A | | 1/1991 | Kluczynski |
| 6,000,678 | A | | 12/1999 | Coakley |
| 6,786,238 | B2 | | 9/2004 | Frisch |
| 9,309,900 | B2 | | 4/2016 | Kopp |
| 2002/0134444 | A1 | * | 9/2002 | Isobe ........................ F01L 1/34 137/625.65 |
| 2015/0047729 | A1 | | 2/2015 | Kopp et al. |
| 2016/0049230 | A1 | * | 2/2016 | Cichon ................... H01F 7/021 251/30.01 |

* cited by examiner

SERVOVALVE

FOREIGN PRIORITY

This application claims priority to European Patent Application No. 16461550.2 filed Aug. 16, 2016, the entire contents of which is incorporated herein by reference.

TECHNICAL FIELD

The present disclosure relates to servovalves used to transfer quantities of, or manage the flow of fluid e.g. air.

BACKGROUND

Servovalves find a wide range of applications for controlling air or other fluid flow to effect driving or control of another part e.g. an actuator.

A servovalve assembly includes a motor controlled by a control current which controls flow to an air valve to control an actuator. Generally, a servovalve transforms an input control signal into movement of an actuator cylinder. The actuator controls e.g. an air valve. In other words, a servovalve acts as a controller, which commands the actuator, which changes the position of an air valve's (e.g. a so-called butterfly valve's) flow modulating feature.

Such mechanisms are used, for example, in various parts of aircraft where the management of air/fluid flow is required, such as in engine bleeding systems, anti-ice systems, air conditioning systems and cabin pressure systems. Servovalves are widely used to control the flow and pressure of pneumatic and hydraulic fluids to an actuator.

Conventionally, servovalve systems operate by obtaining pressurised fluid from a high pressure source which is transmitted through a load from which the fluid is output as a control fluid. Various types of servovalves are known—see e.g. GB 2104249, US 2015/0047729 and U.S. Pat. No. 9,309,900.

Electrohydraulic servovalves can have a first stage with a motor, e.g. an electrical or electromagnetic force motor controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve.

Particularly in aircraft applications, but also in other applications, servovalves are often required to operate at various pressures and temperatures. For e.g. fast acting air valve actuators, relatively large flows are required depending on the size of the actuator and the valve slew rate. For such high flow rates, however, large valve orifice areas are required. For 'flapper' type servovalves, problems arise when dealing with large flows due to the fact that flow force acts in the direction of the flapper movement and the motor is forced to overcome the flow forces. For clevis-like metering valves such as described in U.S. Pat. Nos. 4,046,061 and 6,786,238, the flow forces, proportional to the flow, act simultaneously in opposite directions so that the clevis is balanced and centered. The clevis, however, needs to be big due to the requirement for bigger orifices to handle larger flows.

There is a need for a servovalve arrangement that can handle large fluid flows effectively, whilst retaining a compact design.

The present invention provides a servovalve comprising: a fluid transfer valve assembly comprising a supply port and a control port; a moveable valve spool arranged to regulate flow of fluid from the supply port to the control port in response to a control signal; and a drive member configured to axially move the valve spool relative to the fluid transfer assembly in response to the control signal to regulate the fluid flow; wherein the valve spool comprises a tubular member defining a conduit for fluid from the supply port and an opening in fluid flow alignment with the supply port such that fluid flows from the supply port into the tubular member conduit; the valve spool further comprising an aperture via which fluid flows out from the conduit; and wherein the valve spool is axially moveable between an open position in which a fluid flow path is formed between the aperture and the control port and a closed position in which fluid is blocked from flowing between the aperture and the control port.

Preferably, the fluid transfer valve assembly further comprises a return port in fluid communication with the control port when the spool is in the closed position.

The drive member is preferably an elongate member having a first end arranged for driving connection with a motor and a second end which is preferably a ball joint, arranged to engage the valve spool.

In a preferred embodiment, a plurality of apertures are provided in the circumference of the spool.

Preferred embodiments will now be described with reference to the drawings.

DETAILED DESCRIPTION

Figure 1:
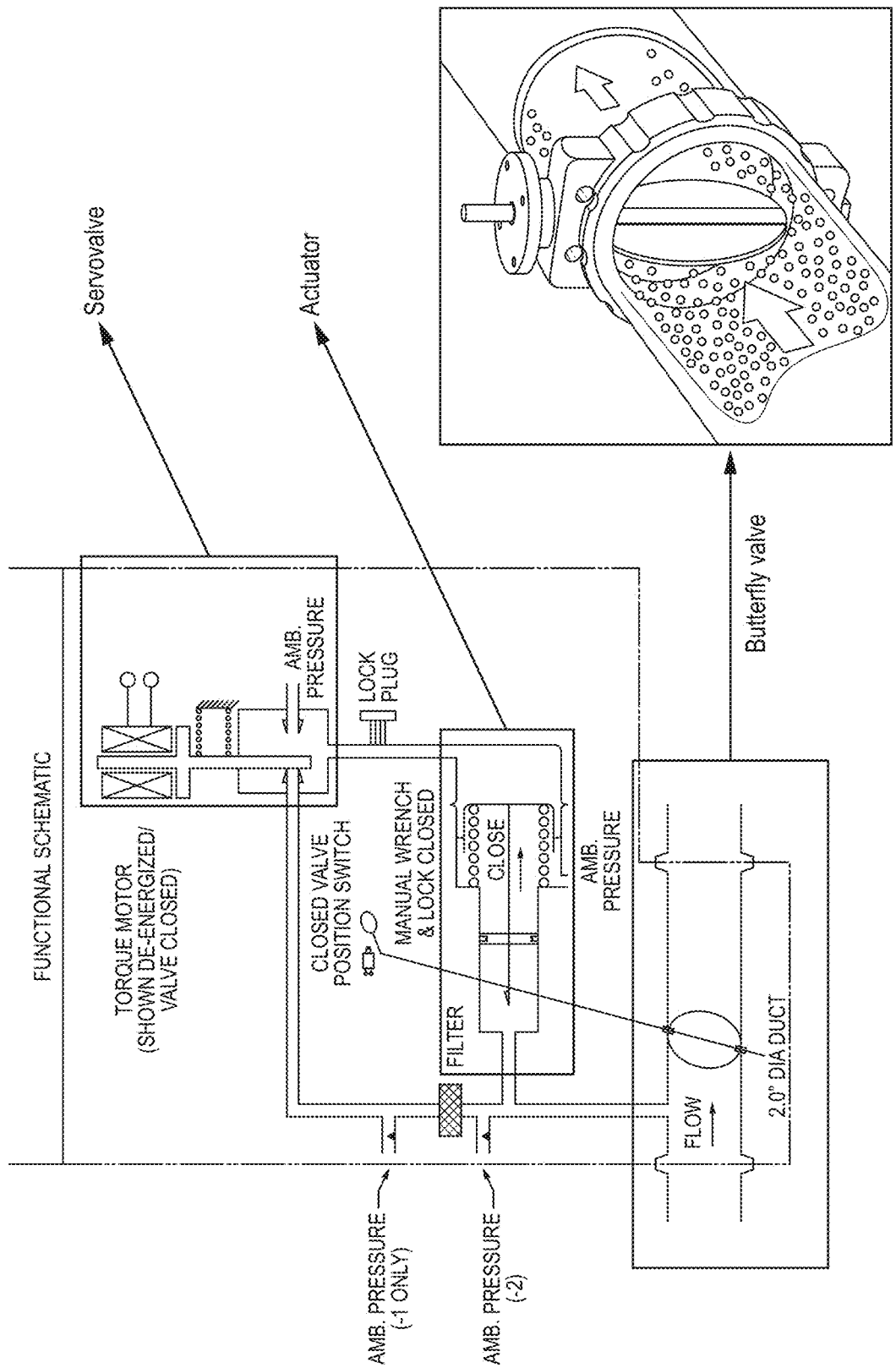
FIG. 1 is a functional schematic view of a servovalve according to the disclosure incorporated in an actuator control system.

With reference to FIG. 1, a servovalve can be used in an actuator control system. The servovalve is controlled by a torque motor to control a control flow of fluid that is output via e.g. a butterfly value to control the movement of an actuator.

Figure 2:
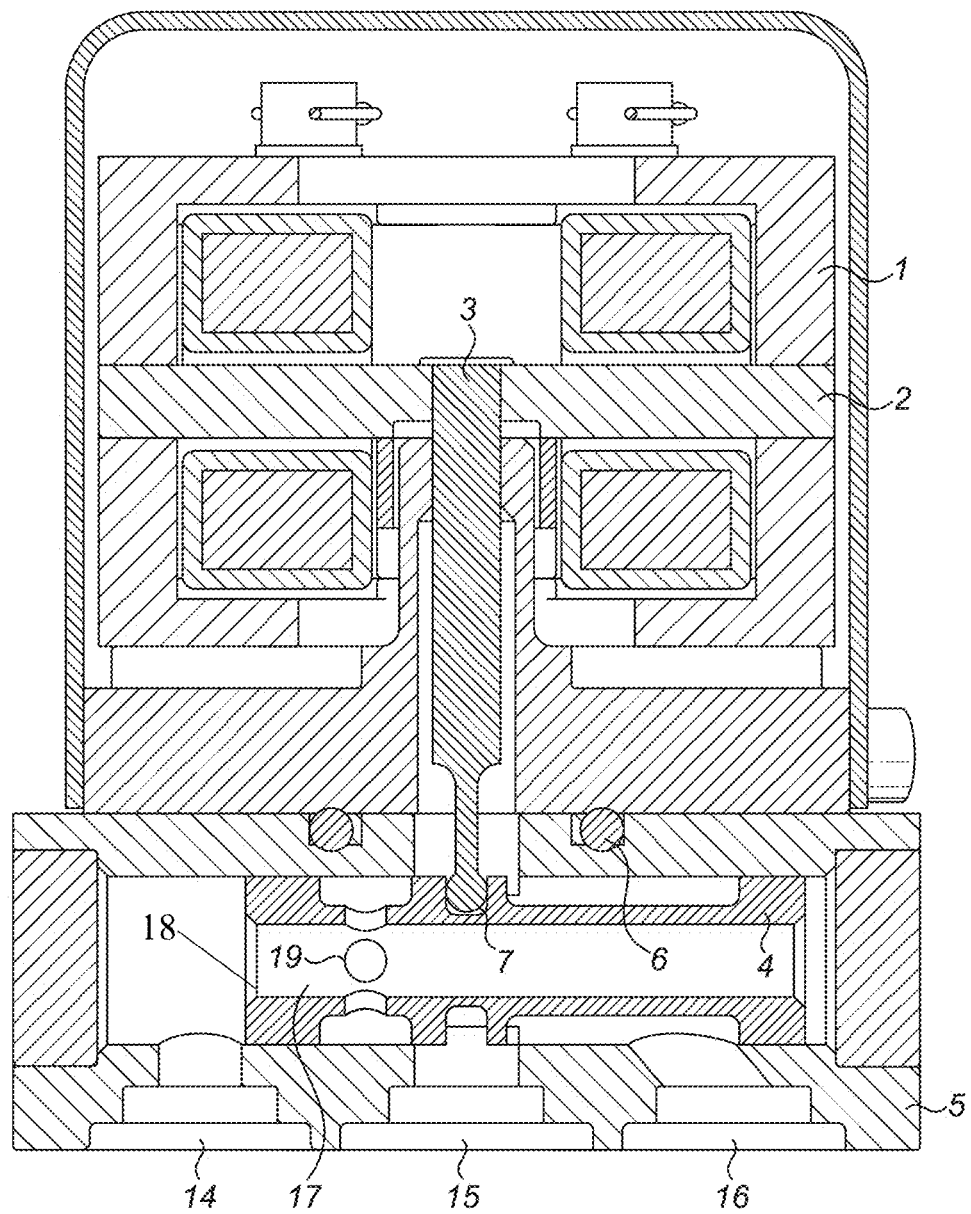
FIG. 2 is a cross-sectional view of a servovalve according to the disclosure.

With reference to the other drawings, starting from FIG. 2, the preferred embodiment comprises, in brief, a servovalve assembly having a torque motor 1 and a moveable armature 2 mounted on a torsion bridge. The armature is jointed through a rigid beam 3 ending with a ball joint 7. A spool 4 is mounted in a supporting block 5. The armature 2 engages with the moveable spool 4 via the ball joint 7. This enables rotation of the armature 2 to translate to axial movement of the spool 4. The spool 4 is part of a spool assembly having three ports: a supply port 14, a control port 15, and a return port 16. Flow is possible between the three ports via a passage 17 through the spool 4. The torque motor moves the armature 2 causing axial movement of the spool 4 which either blocks/occludes the passage between the supply port and the control port or opens the passage to allow flow between the two ports, depending on the axial position of the spool due to the position of the armature 2, thus modulating pressure on the control port 15 and controlling the actuator (not shown). The spool 4 and the block 5 form a 3-way control valve, in which supply pressure is distributed on both sides of the spool to balance forces i.e. so that there are no axial forces on the spool. To assure proper adjustment of the control valve, the joint between the torque motor 1 and the supporting block 5 is preferably sealed. The movement of the spool and, thus, the flow rate from the control port 15 depend on applied electric current from the motor.

With reference to FIG. 2, in particular, the assembly is arranged to control an actuator based on the fluid flow from the control port 15 e.g. via a butterfly valve (see FIG. 1). The servovalve controls an actuator which, in turn, controls an air valve such as a butterfly valve.

Supply pressure is provided to the servovalve housing via supply port 14. The pressure at return port 16 is atmospheric pressure which will vary depending e.g. on the altitude of the aircraft in flight. Control port 15 provides a controlled pressure, dependant on the armature position and resulting spool position, to be provided to an actuator.

The spool 4 is in the form of a tubular member arranged in the block 5 to be moved axially by the armature 3 that engages with the spool 4. The spool has, at one end, an opening 18 in fluid engagement with the supply port 14 such that fluid from the supply port enters the opening and fills the interior of the spool 4. Between the opening 18 and the other end of the spool 4, preferably between the opening 18 and the location where the armature 3 engages the spool 4, the spool is provided with one or more apertures 19 via which fluid can exit the spool.

Figure 3:
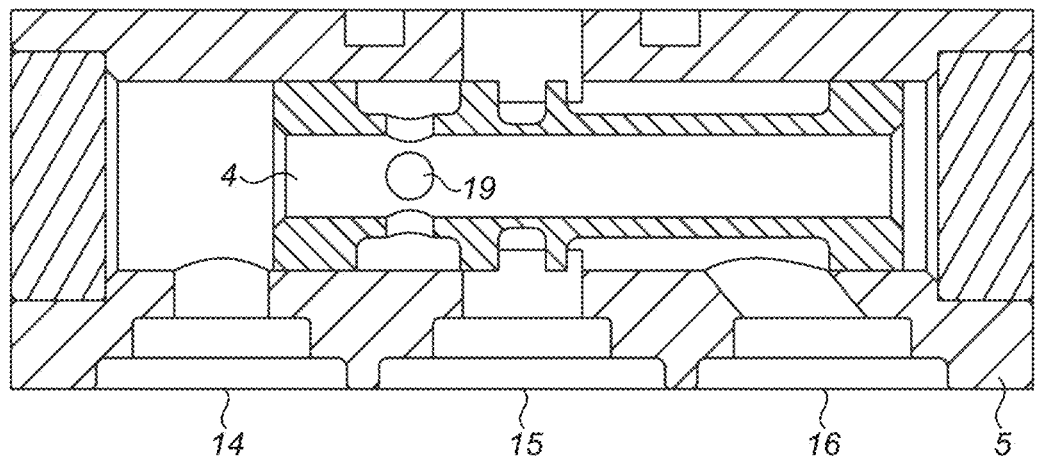
FIG. 3 is a cross-sectional view of the spool of the servovalve of FIG. 2.
Figure 4:
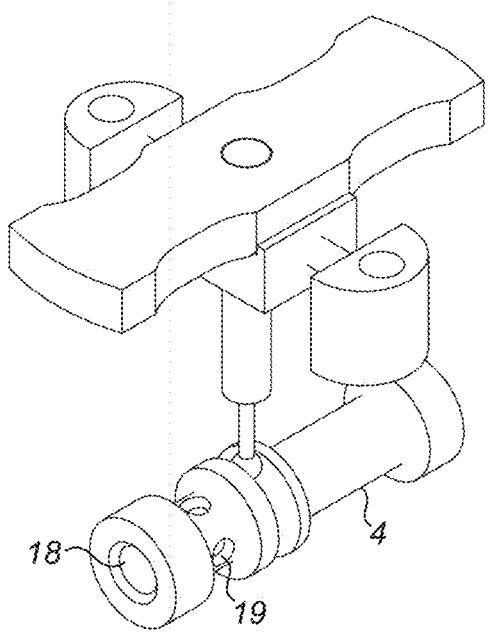
FIG. 4 is a perspective view of a servovalve according to the disclosure.
Figure 6:
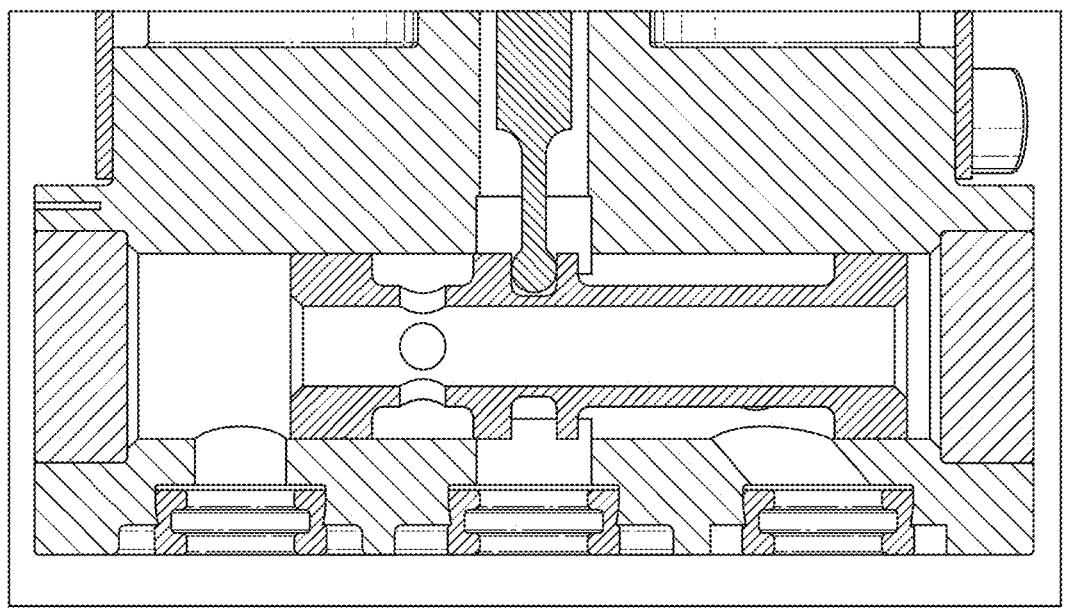
FIG. 6 shows the servovalve of FIG. 3 in a fully closed position.

In the closed position, the armature 3 (under control of the control signal/motor) positions the spool 4 relative to the block 5 and the control port 15 such that there is no fluid flow path between the aperture(s) 19 and the control port 15, as can be seen in FIGS. 2, 3 and 6. The fluid from the supply port and inside the spool 4 provides a balanced pressure acting on the spool.

Figure 5:
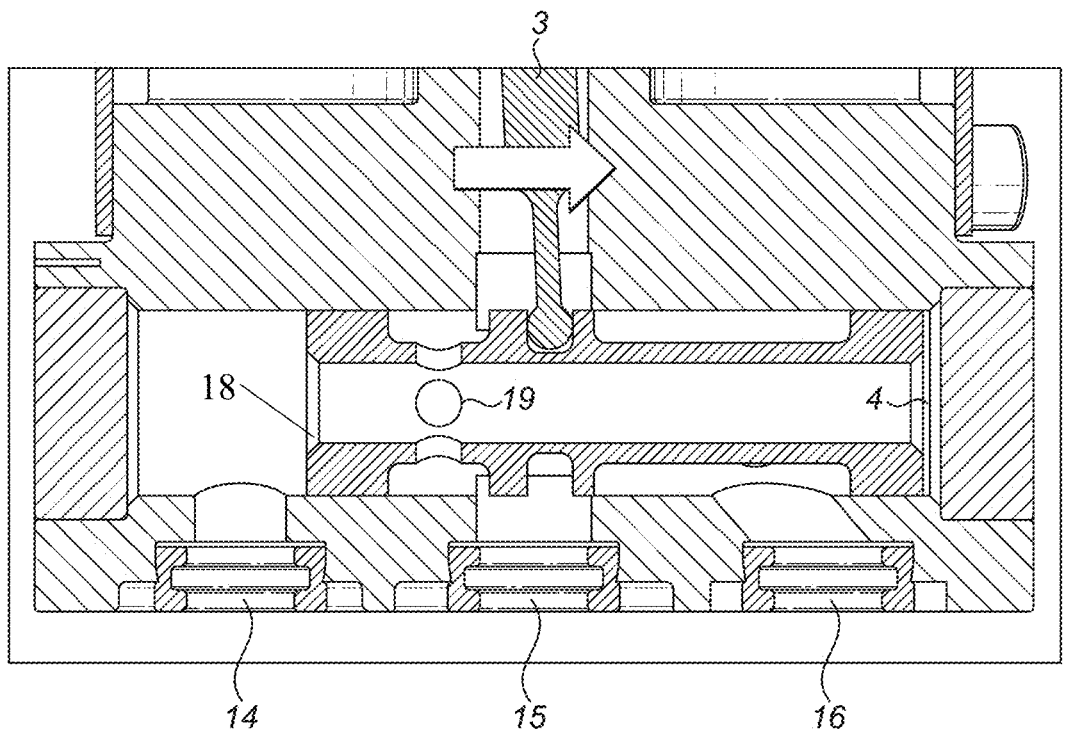
FIG. 5 shows the servovalve of FIG. 3 in a fully opened position.

When a control signal is sent to open the servovalve, the motor 1 drives the armature 3 to move the spool 4 axially (to the right in the drawings) so that the aperture(s) 19 overlap with the control port 15 to provide a fluid flow path from the supply port to the control port via the aperture(s). This can be seen in FIGS. 5 and 7. In this position, the return port or exhaust is closed.

Fluid can then flow through the control port 15 to an actuator to control the position of an air valve e.g. a butterfly valve.

Figure 7:
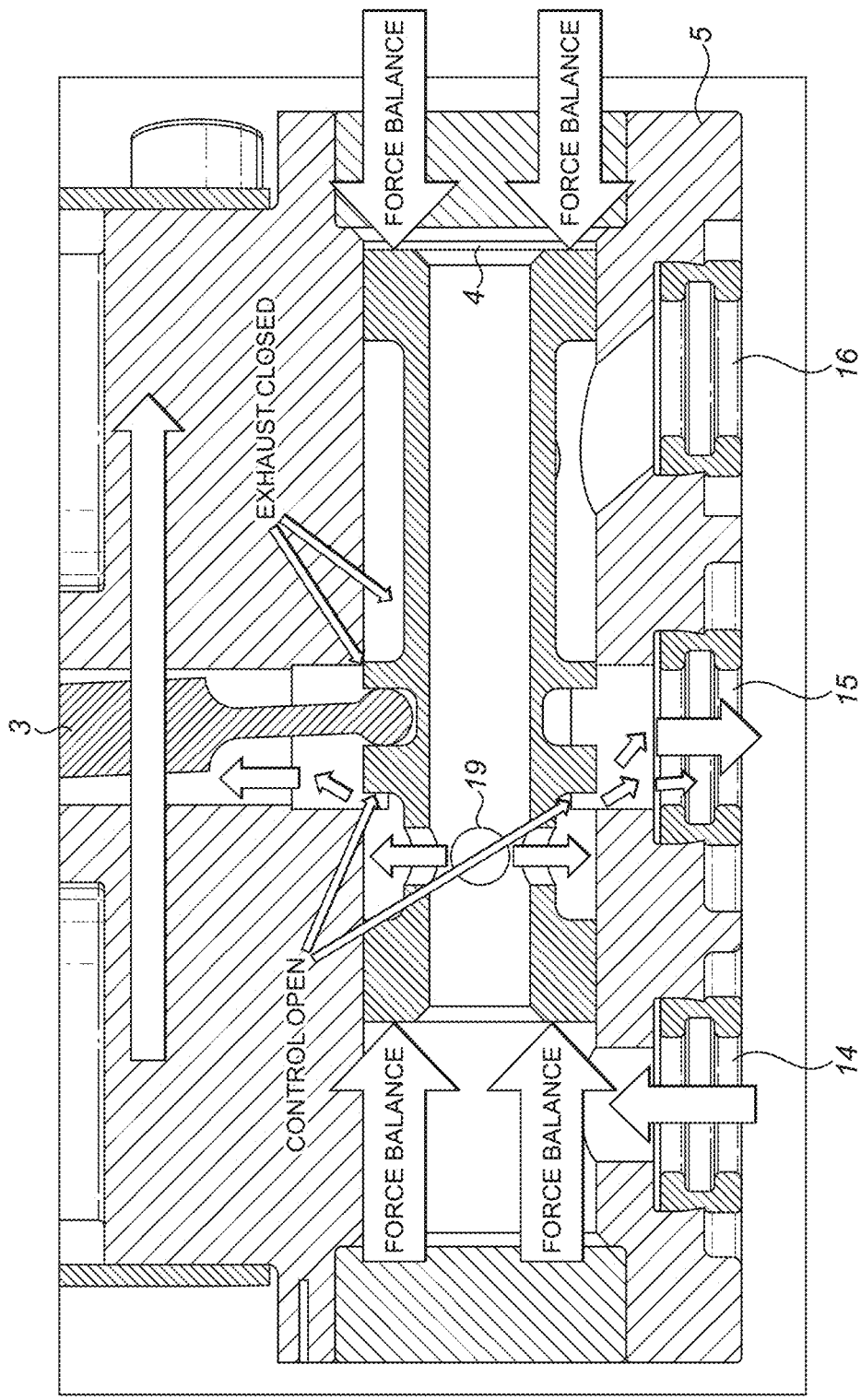
FIG. 7 shows the servovalve of FIGS. 5 and 6 showing the forces in balance acting on the spool.

As can be best seen in FIG. 7 there is a force balance acting on the two sides of the spool 4 (see arrows).

In more detail, in the embodiment shown, to open the servovalve, control current is provided to coils of the motor (here a torque motor) creating electromagnetic torque opposing the sum of mechanical and magnetic torque already 'present' in the torque motor 1. The bigger the electromagnetic force from the coils, the more the armature 3 rotates. The more it rotates, the greater the linear or axial movement of the spool 4. A torque motor usually consists of coil windings, a ferromagnetic armature, permanent magnets and a mechanical spring (here two torsional bridge shafts). This arrangement ideally provides movement of some kind of member (here the armature 3) proportional to the input control current. Other types of motor could be envisaged.

To close the valve, the motor is either non-energized or, in some embodiments drives the armature in the opposite direction, so that the orifice creating a passage for fluid flow between the supply port 14 and the control port 15 is closed off and no fluid flows. FIG. 6 shows the spool in the closed position. In this position, the exhaust or return port 16 is open.

Figure 8:
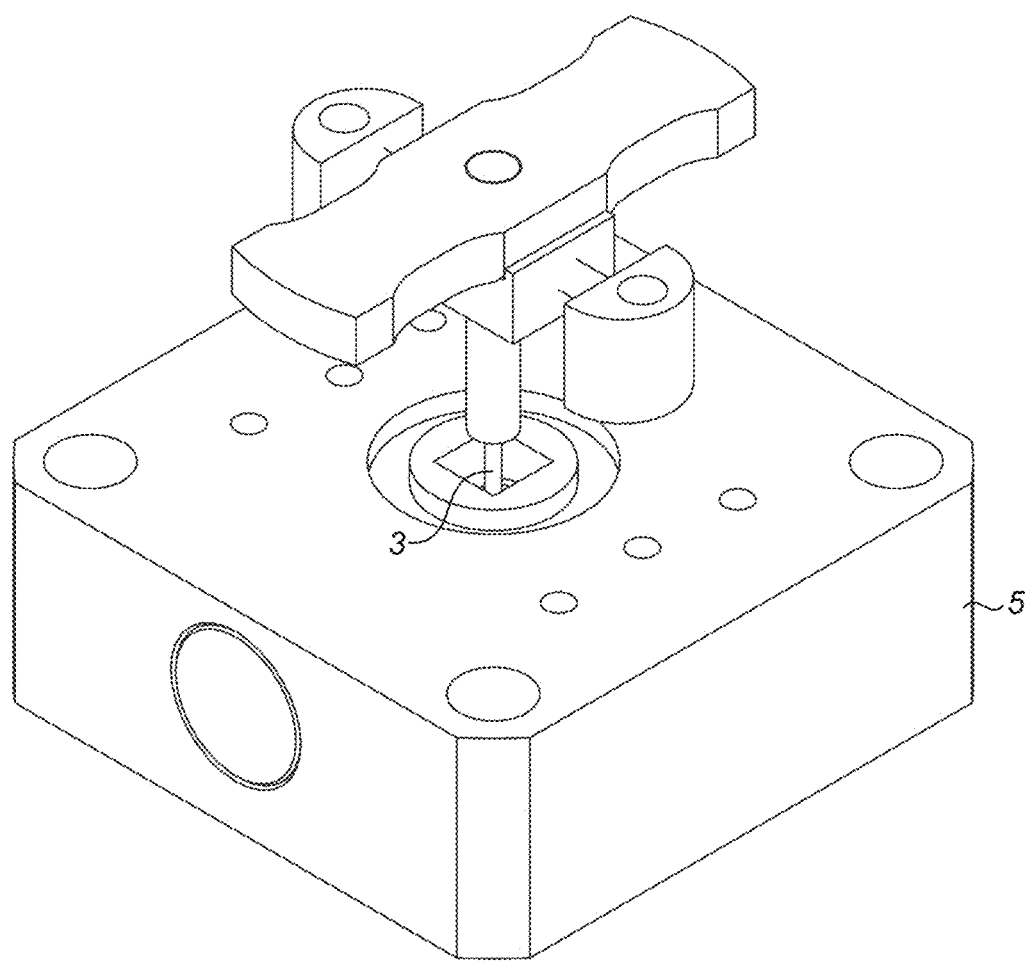
FIG. 8 is a perspective view of the servovalve assembly.

FIG. 8 shows a perspective view of the servovalve with the armature 3 extending into the block 5 within which the spool is mounted. The shape and configuration is clearly just one possible example.

Figure 9:
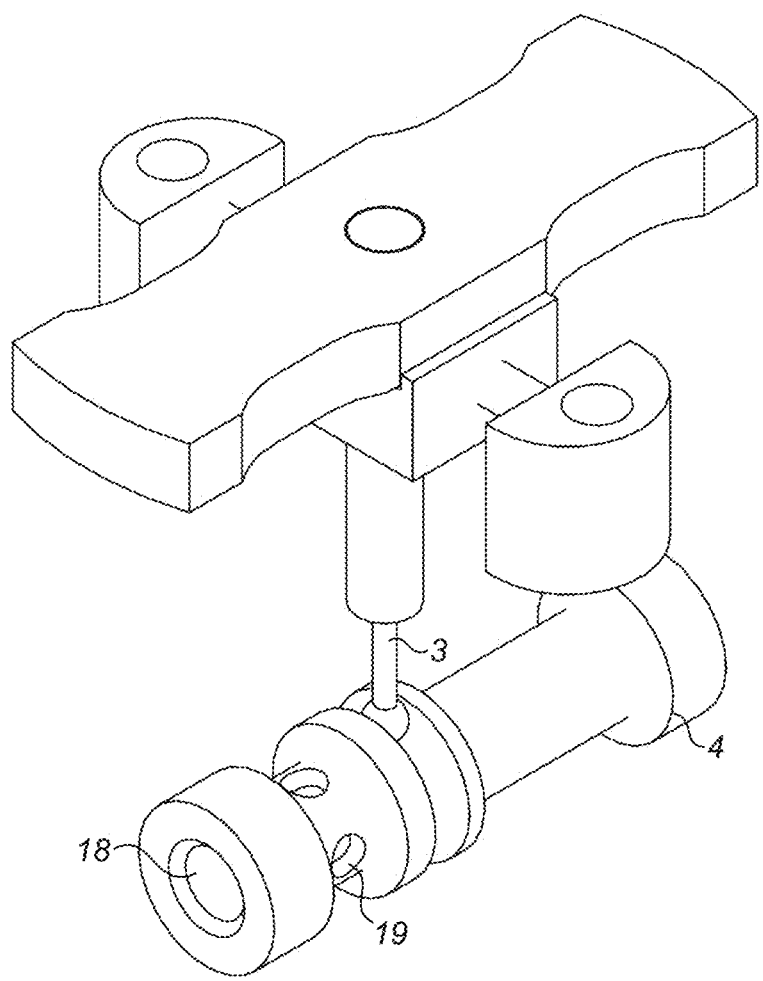
FIG. 9 is a perspective view of the servovalve assembly of FIG. 8 with the housing removed.

FIG. 9 shows the assembly of FIG. 8 but with the block removed to show the spool 4.

With this spool arrangement, the supply pressure is distributed on both sides of the spool to balance forces acting on the spool. The arrangement is, therefore, able to handle large fluid flows without requiring an increase in size of the assembly. The balanced pressure means that the spool does not need to overcome forces from pressure.

The design of the torque motor allows for simplified calibration in embodiments in which it is detachable from the servovalve assembly.

The invention claimed is:

1. A three-way servovalve comprising:
   a fluid transfer valve assembly comprising a supply port, a return port and a single control port, the servovalve controlling a pressure provided to an actuator via the control port to control a butterfly valve;
   a moveable valve spool arranged to regulate flow of fluid from the supply port to the control port in response to a control signal; and
   a drive member configured to axially move the valve spool relative to the fluid transfer valve assembly in response to the control signal to regulate the fluid flow;
   wherein the valve spool comprises a tubular member defining a through conduit for fluid from the supply port and an opening in fluid flow alignment with the supply port such that fluid can flow from the supply port into the tubular member conduit and provide a balanced pressure acting on the spool;
   the valve spool further comprising an aperture via which fluid flows out from the through conduit; and
   wherein the valve spool is axially moveable between an open position in which a fluid flow path is formed between the aperture and the single control port and fluid flow between the return port and the single control port is blocked and a closed position in which a fluid flow path is formed between the return port and the single control port and fluid is blocked from flowing between the aperture and the control port.

2. The servovalve of claim 1, wherein the drive member is an elongate member having a first end arranged for driving connection with a motor and a second end arranged to engage the valve spool.

3. The servovalve of claim 2, wherein the second end of the drive member comprises a ball joint.

4. The servovalve of claim 1, further comprising a motor in driving engagement with the drive member.

5. The servovalve of claim 1, comprising a plurality of said apertures.

* * * * *